United States Patent [19]
Suzuki et al.

[11] Patent Number: 5,730,508
[45] Date of Patent: Mar. 24, 1998

[54] BRAKE FLUID PRESSURE CONTROL APPARATUS HAVING FLUID ACCUMULATION FOR IMPROVED RESPONSIVENESS

[75] Inventors: Hideaki Suzuki; Sadayuki Ohno, both of Kariya, Japan

[73] Assignee: Nippondenso Co., Ltd., Kariya, Japan

[21] Appl. No.: 579,980

[22] Filed: Dec. 28, 1995

[30] Foreign Application Priority Data

Dec. 28, 1994 [JP] Japan .................... 6-327541
Oct. 13, 1995 [JP] Japan .................... 7-265687

[51] Int. Cl.$^6$ .................................... B60T 8/48
[52] U.S. Cl. .................... 303/116.1; 303/116.2; 303/113.2
[58] Field of Search ................... 303/116.1, 116.2, 303/113.1, 113.2

[56] References Cited

U.S. PATENT DOCUMENTS

| | | |
|---|---|---|
| 4,878,715 | 11/1989 | Toda . |
| 5,207,485 | 5/1993 | Troster . |
| 5,246,280 | 9/1993 | Sigl . |
| 5,271,667 | 12/1993 | Takata et al. . |
| 5,290,098 | 3/1994 | Burgdorf et al. .......... 303/116.2 |
| 5,364,176 | 11/1994 | Sawada . |
| 5,368,374 | 11/1994 | Fujimoto . |
| 5,374,112 | 12/1994 | Takata . |
| 5,405,191 | 4/1995 | Nishiyama et al. . |
| 5,411,326 | 5/1995 | Linhoff .................... 303/113.2 |
| 5,484,194 | 1/1996 | Reinartz et al. ........... 303/116.2 |
| 5,605,385 | 2/1997 | Zaviska et al. . |

FOREIGN PATENT DOCUMENTS

| | | |
|---|---|---|
| 0 539 899 | 5/1993 | European Pat. Off. . |
| 41 38 027 | 5/1993 | Germany . |
| 5-065388 | 9/1933 | Japan . |
| 2-018150 | 1/1990 | Japan . |
| 5-193473 | 8/1993 | Japan . |
| 6-080071 | 3/1994 | Japan . |
| 6-191388 | 7/1994 | Japan . |
| 6-255467 | 9/1994 | Japan . |
| 9118776 | 12/1991 | WIPO ............... 303/116.2 |
| 9314961 | 8/1993 | WIPO ............... 303/11.62 |
| 9321047 | 10/1993 | WIPO ............... 303/116.2 |

*Primary Examiner*—Matthew C. Graham
*Attorney, Agent, or Firm*—Cushman Darby & Cushman IP Guoup of Pillsbury Madison & Sutro LLP

[57] ABSTRACT

A brake fluid pressure control apparatus that can switch from brake fluid pressure control to normal brake operation immediately after the brake fluid pressure control terminates. This apparatus has a master cylinder, pressure control valves for controlling the brake fluid pressure in wheel cylinders and a pump for pumping out the brake fluid to the wheel cylinders. It also has an accumulation chamber connected to an inlet of the pump which accumulates the brake fluid in an airtight condition to generate negative pressure. Further, it has a cut-off valve for cutting off the flow of the brake fluid from the master cylinder to wheel cylinders and a return conduit connected between the wheel cylinders and the accumulation chamber.

12 Claims, 2 Drawing Sheets

1

BRAKE FLUID PRESSURE CONTROL APPARATUS HAVING FLUID ACCUMULATION FOR IMPROVED RESPONSIVENESS

CROSS REFERENCE TO RELATED APPLICATIONS

This application is based upon and claims priority from Japanese Patent Applications Nos. Hei 6-327541 filed Dec. 28, 1994, and Hei 7-265687 filed Oct. 13, 1995, the contents of which are incorporated herein by reference.

BACKGROUND OF THE INVENTION

1. Field of the Invention

The present invention relates to a brake fluid pressure control apparatus that can perform anti-skid control and traction control to keep a wheel in an optimum slip condition.

2. Description of Related Art

A brake fluid pressure control apparatus which keeps wheels in an optimum slip condition during a braking operation or an accelerating operation and controls a braking force of a vehicle or an accelerating force thereof adequately, has been known. That is, in such a conventional brake fluid pressure control apparatus, anti-skid control is performed during the braking operation and traction control is performed during the accelerating operation. One example of such a conventional apparatus is disclosed in Japanese Patent Laid-Open Publication No. Hei 6-135314.

The conventional apparatus disclosed in the above document comprises a first reservoir for reserving excessive brake fluid discharged from wheel cylinders when the brake fluid pressure is decreased during anti-skid control and when the brake fluid pressure is decreased during traction control, and a second reservoir for accumulating a predetermined quantity of the brake fluid to apply the brake fluid to the wheel cylinders during traction control without supply of the brake fluid from a master cylinder. In this apparatus, when the pressure in the wheel cylinder is decreased after the pressure in the wheel cylinder is increased by traction control, the brake fluid flows in the first reservoir. Accordingly, at this time, the brake fluid in the second reservoir is reduced by the quantity of the brake fluid used for increasing the pressure of the wheel cylinder during traction control. The brake fluid reserved in the first reservoir is pumped up and returned to the second reservoir to compensate for the reduction of the brake fluid. A switching valve is provided which prevents the brake fluid from flowing from the master cylinder to the wheel cylinders during traction control. When the brake fluid is returned to the second reservoir, the switching valve prevents the brake fluid from flowing from the master cylinder to the wheel cylinders. By accumulating the brake fluid in the second reservoir as described above, when traction control will be started next time, the brake fluid pressure can be applied to the wheel cylinder with the brake fluid in the second reservoir.

However, in the conventional brake fluid pressure control apparatus described above, even after an excessive slip of the wheels during the accelerating operation is released, i.e., even after traction control terminates, the switching valve keeps preventing the brake fluid from flowing to the wheel cylinders while the second reservoir is filled up. Therefore, a driver receives an unnatural feeling from the braking operation during that time, because the brake fluid does not flow to the wheel cylinders even though the driver depresses the brake pedal.

SUMMARY OF THE INVENTION

In view of the above-described problems of the prior art, it is an object of the present invention to provide a brake fluid pressure control apparatus which prevents a flow of the brake fluid between a master cylinder and wheel cylinders during traction control, which accumulates the brake fluid for traction control beforehand in a brake fluid control system to apply the brake fluid to the wheel cylinders during traction control, which increases the pressure of the wheel cylinders with the brake fluid accumulated beforehand during traction control, and especially which can shift a control mode from a brake fluid pressure control mode to a normal brake mode immediately after the brake fluid pressure control terminates.

To achieve this object, the brake pressure control apparatus includes a prohibiting device for prohibiting brake fluid from an oil pressure source (a master cylinder) to flow to wheel cylinders while a pressure increasing and decreasing control device controls the brake fluid pressure. Accordingly, until the pressure increasing and decreasing control device terminates its control of the brake fluid pressure of the wheel cylinder after it starts to control its pressure, the brake fluid pressure applied to the wheel cylinder is controlled without supply of the brake fluid from the oil pressure source. That is, during brake fluid pressure control by the pressure increasing and decreasing control device, the brake fluid flows through the brake fluid control system while isolated from the oil pressure source.

A pump is provided, which is driven when the pressure increasing and decreasing control device performs brake pressure control, to pump out the brake fluid accumulated in an accumulation chamber in advance. The pressure increasing and decreasing control device increases the brake fluid pressure in the wheel cylinder using this brake fluid. When the pump pumps out the brake fluid from the accumulation chamber, negative pressure is generated in the accumulation chamber. After that, when the brake fluid pressure in the wheel cylinder is decreased by the pressure increasing and decreasing control device, the brake fluid returns to the accumulation chamber through a return conduit due to a suction force created by the negative pressure. The quantity of brake fluid pumped out from the accumulation chamber is proportional to the magnitude of the negative pressure generated in the accumulation chamber. Therefore, an amount of brake fluid identical to the amount of brake fluid pumped out by the pump returns to the accumulation chamber due to the negative pressure. That is, because the brake fluid is sucked into the accumulation chamber by the suction force due to the negative pressure after brake fluid is pumped out from the accumulation chamber, after brake fluid pressure control terminates, an amount of brake fluid identical to the amount of brake fluid accumulated in the accumulation chamber in advance exists in the accumulation chamber. As a result, a pump is not necessary for returning the brake fluid to the accumulation chamber, which is different from the prior art. Also, because prohibition of the flow of the brake fluid between the oil pressure source and the wheel cylinder can be released immediately after the termination of the pressure decreasing control by the pressure increasing and decreasing control device, a driver can perform the normal brake operation promptly.

The accumulation chamber may be formed to have a constant capacity in order to generate the negative pressure when the pump pumps out the brake fluid. This makes it possible to cause the negative pressure to be generated with a simple structure.

Also, the apparatus can have an anti-skid control device and a traction control device. When the pressure in the wheel cylinder is decreased by the anti-skid control device, the excessive brake fluid applied to the wheel cylinder is reserved by the reservoir. Normally, when anti-skid control terminates, the brake fluid in the reservoir is sent back to the oil pressure source by the pump. If the brake fluid remains in the reservoir, more brake fluid cannot be reserved in the reservoir. As a result, the pressure in the wheel cylinder cannot be decreased during the next anti-skid control.

When at least traction control is performed, a prohibiting device prohibits the flow of the brake fluid between the oil pressure source and the wheel cylinder. Because the brake fluid does not exist in the reservoir when traction control is performed, the pressure in the wheel cylinder is increased with the brake fluid pumped out from the accumulation chamber by the pump. When traction control terminates, the brake fluid is sucked from the wheel cylinder into the accumulation chamber by the negative pressure. Therefore, because the prohibiting device prohibits the flow of the brake fluid from the master cylinder to the wheel cylinder, the brake fluid is not pumped out from the master cylinder by the pump. Even though a driver depresses a brake pedal as a result of noticing an occurrence of wheel slip during traction control, the brake fluid does not flow to the wheel cylinder from the master cylinder. Accordingly, it is not necessary that the brake fluid be sent back to the master cylinder by the pump at the end of traction control.

The brake fluid pressure control apparatus can include a plurality of wheel cylinders, a master pressure cut-off valve, first and second pressure increasing control valves, first and second pressure decreasing control valves, first and second return conduits, and an accumulation chamber for generating negative pressure. According to this apparatus, the same function and result as the above apparatus can be obtained.

An accumulation chamber and a reservoir may be integrated into one body. As a result, the number of parts may be reduced and the size of the apparatus becomes compact.

Also, gas or liquid to promote the generation of the negative pressure may be enclosed in the accumulation chamber. In this case, when the brake fluid is pumped out from the accumulation chamber to the wheel cylinder by the pump, the negative pressure easily and smoothly is generated in the accumulation chamber. Since the brake fluid is normally incompressible, when the brake fluid is pumped out from the accumulation chamber by the pump, the gas which exists in the brake fluid is separated therefrom and collects in the accumulation chamber. The negative pressure in the accumulation chamber is proportional to a quantity of the gas collected in the accumulation chamber or an expansion of the gas. However, if the quantity of the gas which exists in the brake fluid is small and the generation of the gas is not sufficient, when the brake fluid is pumped out from the accumulation chamber, the brake fluid flowing out of the accumulation chamber may be minute. For these reasons, if compressible gas or liquid is enclosed in the accumulation chamber, the negative pressure easily and smoothly is generated in the accumulation chamber as a result that the gas or the liquid expands.

Other objects and features of the invention will appear in the course of the description thereof, which follows.

BRIEF DESCRIPTION OF THE DRAWING

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

The preferred embodiments of the present invention are hereinafter described with reference to the accompanying drawings.

A first preferred embodiment of the brake fluid pressure control apparatus according to the present invention will be explained with reference to the figures. The brake fluid pressure control apparatus according to the first embodiment can be applied to driving wheels and can be applied to any type of vehicles such as an FF vehicle, an FR vehicle or a 4WD-vehicle. The brake apparatus of the vehicle normally consists of two brake systems. That is, it may be a T—T conduit system in which the conduit of the brake fluid connects the wheel cylinders of a front right wheel and a front left wheel and a separate system connects the wheel cylinders of a rear right wheel and a rear left wheel, or it may be an X conduit system in which the conduit connects the wheel cylinders of a front right wheel and a rear left wheel and a separate system connects the wheel cylinders of a front left wheel and a rear right wheel. In that case, the brake apparatus according to the first embodiment is applied to each brake system.

The structure of the brake fluid pressure control apparatus according to the first embodiment will be explained based on FIG. 1. First of all, a brake fluid circuit for the anti-skid control will be explained.

Figure 1:
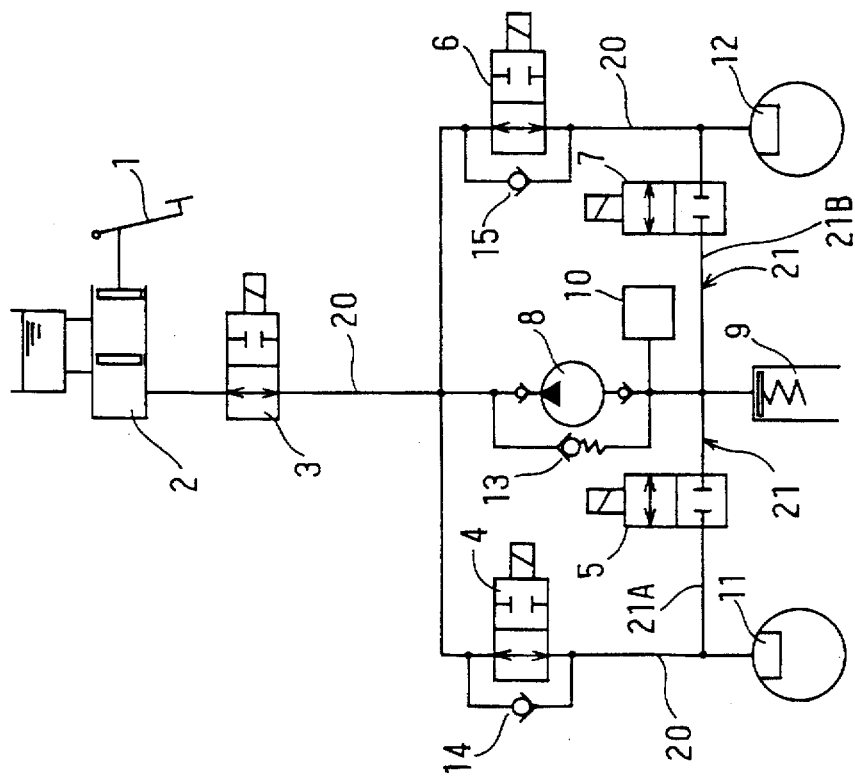
FIG. 1 is an oil pressure circuit showing the structure of a brake fluid pressure control apparatus according to a first preferred embodiment of the present invention.

In FIG. 1, a brake pedal 1 is connected to a master cylinder 2, which is an oil pressure source having its own reservoir. Brake fluid pressure in the master cylinder 2 generated when a driver depresses brake pedal 1 is transmitted to a first wheel cylinder 11 and a second wheel cylinder 12 through a brake conduit 20. Brake pedal 1 is a pressure increasing means which generates the brake fluid pressure in proportion to the depressing force applied thereto by the driver. Brake conduit 20 connects master cylinder 2 and wheel cylinders 11 and 12. Normal brake operation is performed when the brake pressure in master cylinder 2 is transmitted to the wheel cylinders 11 and 12.

A master pressure cut-off valve 3, which alternatively allows and prohibits the brake fluid from being transferred between master cylinder 2 and first and second wheel cylinders 11 and 12, is disposed in brake conduit 20 extending from an outlet port of master cylinder 2. A pump 8 is disposed in brake conduit 20 between master pressure cut-off valve 3 and first and second wheel cylinders 11 and 12. Pump 8 is driven when the brake fluid pressure is controlled, pumps out the brake fluid from a reservoir 9 and sends out the brake fluid toward first and second wheel cylinders 11 and 12. A first pressure increasing control valve 4 is disposed in brake conduit 20 between pump 8 and first wheel cylinder 11. First pressure increasing control valve 4 alternatively allows and prohibits flow of the brake fluid from pump 8 to first wheel cylinder 11. In the same way as first pressure increasing control valve 4, a second pressure increasing control valve 6 is disposed in brake conduit 20 for alternatively allowing and prohibiting flow of the brake fluid from pump 8 to second wheel cylinder 12. First and second pressure increasing control valves 4 and 6 can control increasing of the brake fluid pressure applied to first and second wheel cylinders 11 and 12. Reservoir 9 and first and second wheel cylinders 11 and 12 are connected by a return conduit 21. Return conduit 21 consists of a first return conduit 21A connecting reservoir 9 and first wheel cylinder 11 and a second return conduit 21B connecting reservoir 9 and second wheel cylinder 12. A first pressure decreasing control valve 5 is disposed in first return conduit 21A for controlling the decreasing of the brake fluid pressure in first wheel cylinder 11. A second pressure decreasing control valve 7 is disposed in second return conduit 21B controlling the decreasing of the brake fluid pressure in second wheel cylinder 12. First and second pressure decreasing control valves 5 and 7 alternatively allow and prohibit the flow of the brake fluid in first and second return conduits 21A and 21B when the brake fluid pressures in first and second wheel cylinders 11 and 12 are decreased.

As described above, first and second pressure increasing control valves 4 and 6 and first and second pressure decreasing control valves 5 and 7 can control increasing and decreasing of the brake fluid pressures applied to first and second wheel cylinders 11 and 12. The control of the brake fluid pressure will be later explained in detail using TABLE 1. Check valves 14 and 15 are connected in parallel with first and second pressure increasing control valves 4 and 6, respectively, and allow the flow of the brake fluid only from wheel cylinders 11 and 12 to master cylinder 2. Also, check valves are provided at an inlet and an outlet of pump 8 to prevent reverse flows of the brake fluid. Further, a relief valve 13 is connected in parallel to pump 8. Relief valve 13 releases the brake fluid to reservoir 9 when a predetermined brake fluid pressure is applied to relief valve 13 from pump 8. Relief valve 13 allows only the flow of the brake fluid from pump 8 to reservoir 9. Therefore, relief valve 13 can prevent high pressure in brake conduit 20 and can protect brake conduit 20 even if first and second pressure increasing control valves 4 and 6 are closed during anti-skid control. Anti-skid control can be performed by the structure explained above. Here, the flow of the brake fluid between master cylinder 2 and first and second wheel cylinders 11 and 12 may not necessarily be prohibited by master pressure cut-off valve 3 during anti-skid control.

In the present embodiment, traction control can be performed as well as anti-skid control by adding the following structure to the structure described above. That is, an accumulation chamber 10, which is formed in an airtight condition and which has a fixed capacity, is connected to the inlet of pump 8. Accumulation chamber 10 has a capacity of a few cubic centimeters and is small with a simple structure. In the accumulation chamber 10, the brake fluid is accumulated beforehand for performing traction control. In other words, before the brake fluid pressure control apparatus is attached to a vehicle, the accumulation chamber is filled with the brake fluid.

Master pressure cut-off valve 3, first and second pressure increasing valves 4 and 6, and first and second pressure decreasing valves 5 and 7 each has two ports and two positions. A valve body thereof switches the port to be opened when electrical power is supplied by a controller (not shown in the figure) and a solenoid thereof is energized. When each of the solenoids is not energized, its respective valve takes the position shown in FIG. 1. In place of the electromagnetic valves described above, mechanical valves can also be used. Further, the controller can calculate and detect the slip condition of the wheels, or another electrical control device (not shown in the figure) may be used to calculate and detect the slip condition of the wheels.

The operation of the brake fluid pressure control apparatus according to the present embodiment described above will be explained hereinafter with reference to TABLE 1.

TABLE 1

|   | Cyl.11 Mode | Cyl.12 Mode | Cutoff Val. 3 | Incre. Val. 4 | Decre. Val. 5 | Incre. Val. 6 | Decre. Val. 7 |
|---|---|---|---|---|---|---|---|
| A | Normal | Normal | O | O | X | O | X |
| B | Decre. | Decre. | X (O) | X | O | X | O |
| C | Decre. | Maint. | X (O) | X | O | X | X |
| D | Maint. | Decre. | X (O) | X | X | X | O |
| E | Maint. | Maint. | X (O) | X | X | X | X |
| F | Incre. | Maint. | X (O) | O | X | X | X |
| G | Maint. | Incre. | X (O) | X | X | O | X |
| H | Incre. | Incre. | X (O) | O | X | O | X |
| I | Incre. | Decre. | X (O) | O | X | X | O |
| J | Decre. | Incre. | X (O) | X | O | O | X |

(O = Open valve, X = Closed valve)

During the normal brake operation, during anti-skid control and during traction control, master pressure cut-off valve 3, first and second pressure increasing valves 4 and 6, and first and second pressure decreasing valves 5 and 7 take positions as shown in TABLE 1. First, the operation during the normal brake operation will be explained. During the normal brake operation, each valve takes a position shown in Mode A which is the same as the position shown in FIG. 1. In this case, when brake pedal 1 is depressed, the brake fluid pressure is generated in master cylinder 2. The brake fluid pressure in master cylinder 2 is transmitted to first and second wheel cylinders 11 and 12 through brake conduit 20. Because first and second pressure decreasing valves 5 and 7 are closed, the flow of the brake fluid toward reservoir 9 is prohibited.

Next the operation during brake fluid pressure control will be explained. That is, it will be explained how each valve is switched in the anti-skid control operation when the wheels are about to be locked by a braking operation, and it will be explained how each valve is switched by the traction control operation when the vehicle accelerates.

When anti-skid control starts, pump 8 begins to be driven. Master pressure cut-off valve 3 may take a position in which the brake fluid flows from master cylinder 2 to wheel cylinders 11 and 12, or the other position to prevent the flow of high pressure brake fluid generated by master cylinder 2. In the brake fluid pressure control apparatus, the brake fluid pressures in first and second wheel cylinders 11 and 12 are increased, decreased and maintained independently of each other. By controlling the brake fluid pressure in first and second wheel cylinders 11 and 12 independently, more adequate braking force or more adequate accelerating force can be obtained when the vehicle is running on a split road on which friction coefficients under right and left wheels are different, or when the braking operation or the accelerating operation is performed while the vehicle is turning.

As shown in Mode B, when the brake fluid pressures in first and second wheel cylinders 11 and 12 are decreased, first and second pressure increasing valves 4 and 6 are closed and first and second pressure decreasing valves 5 and 7 are opened. Accordingly, the brake fluid applied to first and second wheel cylinders 11 and 12 is sent back to reservoir 9 via first and second pressure decreasing valves 5 and 7. Although the brake fluid in reservoir 9 is pumped out by pump 8 and is sent out, since first and second pressure increasing valves 4 and 6 are closed, the brake fluid is not transmitted to first and second wheel cylinders 11 and 12.

When each valve is operated as shown in Mode C and Mode D, the brake fluid pressure in one of wheel cylinders 11 and 12 is maintained while that in the other one is decreased. In these cases, only the pressure decreasing control valve for the wheel cylinder in which the brake fluid pressure is to be decreased is opened.

When each valve is operated as shown in Mode E, the brake fluid pressures in first and second wheel cylinders 11 and 12 can be maintained. In this case, because all of the valves are closed, the brake fluid pressure in brake conduit 20 rises to a predetermined pressure or more due to the brake fluid pumped out from pump 8. That is, even if master pressure cut-off valve 3 is opened, the brake fluid pressure becomes high due to the addition of high brake fluid pressure from master cylinder 2 and the brake fluid pressure pumped out from pump 8. On the other hand, even if master pressure cut-off valve 3 is closed, since brake conduit 20 is closed by each valve, the brake fluid pressure in brake conduit 20 becomes high due to the brake fluid pressure pumped out from pump 8. When the brake fluid pressure in brake conduit 20 reaches a preset pressure for relief valve 13, relief valve 13 opens and the brake fluid returns to reservoir 9. Therefore, because the brake fluid pressure in brake conduit 20 is held to the preset pressure of relief valve 13, brake conduit 20 can be protected.

When each valve is operated as shown in Mode F and Mode G, the brake fluid pressure in one of wheel cylinders 11 and 12 is maintained while that in the other one is increased. In these cases, only the pressure increasing control valve for the wheel cylinder in which the brake fluid pressure is to be decreased is opened. The brake fluid from pump 8 can be applied to the wheel cylinder through this opened valve.

As shown in Mode H, the brake fluid pressures in both of first and second wheel cylinders 11 and 12 can be increased. At this time, first and second pressure increasing control valves 4 and 6 are opened and first and second pressure decreasing control valves 5 and 7 are closed. As a result, the brake fluid pressures in wheel cylinders 11 and 12 can be increased due to the brake fluid pumped out from pump 8.

When each valve is operated as shown in Mode I and Mode J, the brake fluid pressure in one of wheel cylinders 11 and 12 is decreased while that in the other one is increased. At this time, the pressure increasing control valve for the wheel cylinder in which the brake fluid pressure is to be increased is opened and its pressure decreasing control valve is closed. On the contrary, the pressure decreasing control valve for the wheel cylinder in which the brake fluid pressure is to be decreased is opened and its pressure increasing control valve is closed.

While anti-skid control is performed, the brake fluid flows from master cylinder 2 into wheel cylinders 11 and 12 by depressing brake pedal 1. The brake fluid pressure in the wheel cylinder corresponding to the wheel that is about to be locked is decreased, and the brake fluid discharged from the wheel cylinder is reserved in reservoir 9. The brake fluid reserved in reservoir 9 is pumped out by pump 8, and the brake fluid pressure is applied to the wheel cylinder corresponding to the wheel whose speed has recovered. Normally, pump 8 pumps out from reservoir 9. However, if master pressure cut-off valve 3 is closed during anti-skid control, when a change of road surfaces takes place, i.e., when the vehicle moves from a road having low friction coefficient to a road having high friction coefficient, the brake fluid pressure in the wheel cylinder can not be increased sufficiently with the brake fluid in reservoir 9. In this case, the brake fluid in accumulation chamber 10 is pumped out by pump 8 in spite of anti-skid control. As a result, negative pressure is generated in accumulation chamber 10 in response to the flow-out of the brake fluid. Therefore, the brake fluid returns to accumulation chamber 10 due to the suction force of the negative pressure when the brake fluid pressure in the wheel cylinder is decreased by anti-skid control.

A spring is installed in reservoir 9 and the spring pushes the brake fluid out of reservoir 9. However, because the pressure in reservoir 9 is at least equal to atmospheric pressure, when the negative pressure exists in accumulation chamber 10, the brake fluid in reservoir 9 flows into accumulation chamber 10.

While anti-skid control is performed, if master pressure cut-off valve 3 is opened, when the driver reduces the depression of brake pedal 1, the brake fluid applied to wheel cylinders 11 and 12 returns to master cylinder 2 via check valves 14 and 15, even though first and second pressure increasing control valves 4 and 6 are closed. After that, anti-skid control terminates. Therefore, brake fluid pressure control can be performed just as the driver operates brake pedal 1. If first and second pressure increasing control valves 4 and 6 are opened when the controller (not shown in the figure) detects that the driver reduces the depression of brake pedal 1, check valves 14 and 15 can be omitted.

If reservoir 9 is filled with the brake fluid during anti-skid control, the controller may cause at least first and second pressure increasing control valves 4 and 6 to close brake conduit 20. As a result, the brake fluid pumped out from pump 8 flows to master cylinder 2 and the brake fluid in reservoir 9 returns to master cylinder 2.

Next, the operation of each valve during traction control will be explained. In the early stage of traction control, since brake pedal 1 is not depressed, the brake fluid is not supplied from master cylinder 2. Therefore, the brake fluid does not exist in reservoir 9. The brake fluid pressure in wheel cylinders 11 and 12 is increased by the brake fluid accumulated in accumulation chamber 10 during traction control. That is, when wheels of the vehicle reach a predetermined slip state during acceleration of the vehicle, pump 8 is started. The brake fluid flows to the inlet of pump 8 while the negative pressure is generated in accumulation chamber 10 by driving pump 8. The brake fluid is sent out from pump 8 toward first and second wheel cylinders 11 and 12, and the brake fluid pressures in first and second wheel cylinders 11 and 12 are increased. Master pressure cut-off valve 3 is closed during traction control. This is because master pressure cut-off valve 3 prevents the brake fluid pumped out from pump 8 from flowing to master cylinder 2. In addition, because the brake fluid does not flow from master cylinder 2 to wheel cylinders 11 and 12 and the inlet of pump 8 by closing master pressure cut-off valve 3, the brake fluid circulates within a brake fluid circuit between master pressure cut-off valve 3 and first and second wheel cylinders 11 and 12 in order to perform traction control.

The brake fluid pressures in wheel cylinders 11 and 12 are increased, decreased and maintained using the same valve operations as in the anti-skid control operations of TABLE 1. That is, when each valve is operated as shown in Mode B through Mode J of TABLE 1, respective brake fluid pressures in wheel cylinders 11 and 12 are increased, decreased and maintained independently.

When traction control terminates, master pressure cut-off valve 3 is opened. Accordingly, the brake fluid, which is originally accumulated in accumulation chamber 10, returns to accumulation chamber 10 due to the negative pressure therein. As described above, since accumulation chamber 10 sucks the brake fluid due to the negative pressure whenever the brake fluid pressure control terminates, the quantity of the brake fluid in accumulation chamber 10 is constant regardless of whether brake fluid pressure control has been performed. Specifically, since master pressure cut-off valve 3 is closed during brake fluid pressure control, unnecessary brake fluid does not remain in reservoir 9. Therefore, it is not necessary to send the brake fluid back to master cylinder 2 by pump 8.

Suppose the brake fluid pressure control apparatus allows the flow of the brake fluid from master cylinder 2 to wheel cylinders 11 and 12 during traction control, when the driver depresses brake pedal 1 because of noticing the occurrence of the wheel slip, the brake fluid from master cylinder 2 flows in wheel cylinders 11 and 12 in spite of the fact that traction control is being performed. Normally, traction control stops when the depression of brake pedal 1 is detected, and normal brake operation is enabled. However, there is a predetermined time-lag between the detection of brake pedal depression and the switching of each valve. As a result, during the time-lag, the brake fluid flows from master cylinder 2 into wheel cylinders 11 and 12. In this case, since the brake fluid from master cylinder 2 in response to the depression of brake pedal 1 is added to the brake fluid pumped out from pump 8, a large quantity of the brake fluid must be returned to master cylinder 2 or its own reservoir when traction control stops. There is fear of overburdening master cylinder 2 with pressure. However, in the brake fluid pressure control apparatus according to the present embodiment, the brake fluid pressures in wheel cylinders 11 and 12 are increased not by using the brake fluid from master cylinder 2, but instead by using the brake fluid pumped out from accumulation chamber 10 during traction control. When traction control terminates, the brake fluid applied to wheel cylinders 11 and 12 to increase the brake fluid pressure thereof is all returned to accumulation chamber 10. Therefore, the brake fluid pressure control apparatus according to the present embodiment can solve the problems described above. Further, while anti-skid control is performed, even if the brake fluid flows out of accumulation chamber 10, the brake fluid flows in accumulation chamber 10 when anti-skid control terminates. Therefore, because more brake fluid than that which was sent out from master cylinder 2 does not return to master cylinder 2, the master cylinder 2 is not overburdened with the brake fluid. As described above, the brake fluid circulates within the brake fluid circuit during traction control, and the quantity of the brake fluid flowing from master cylinder 2 to wheel cylinders 11 and 12 corresponds to that of the brake fluid returning from wheel cylinders 11 and 12 to master cylinder 2. Therefore, the burden of master cylinder 2 can be reduced.

Because the brake fluid does not need to be returned to accumulation chamber 10 by pump 8 when traction control terminates, immediately after the slip state of the wheels is released and the traction control terminates, pump 8 can be stopped to reduce the noise of pump 8.

In addition, as described above, the brake fluid pressure control apparatus can perform both anti-skid control and traction control, which can independently control the brake fluid pressures in wheel cylinders 11 and 12, by only adding accumulation chamber 10 to the structure of a normal anti-skid control apparatus. In other words, there is no need to prepare an extra valve, and the brake fluid pressure control apparatus can control the braking force and the accelerating force with a simple structure.

The present invention is not limited to the above-mentioned embodiment, and can be modified in various ways as given in the following.

Figure 2:
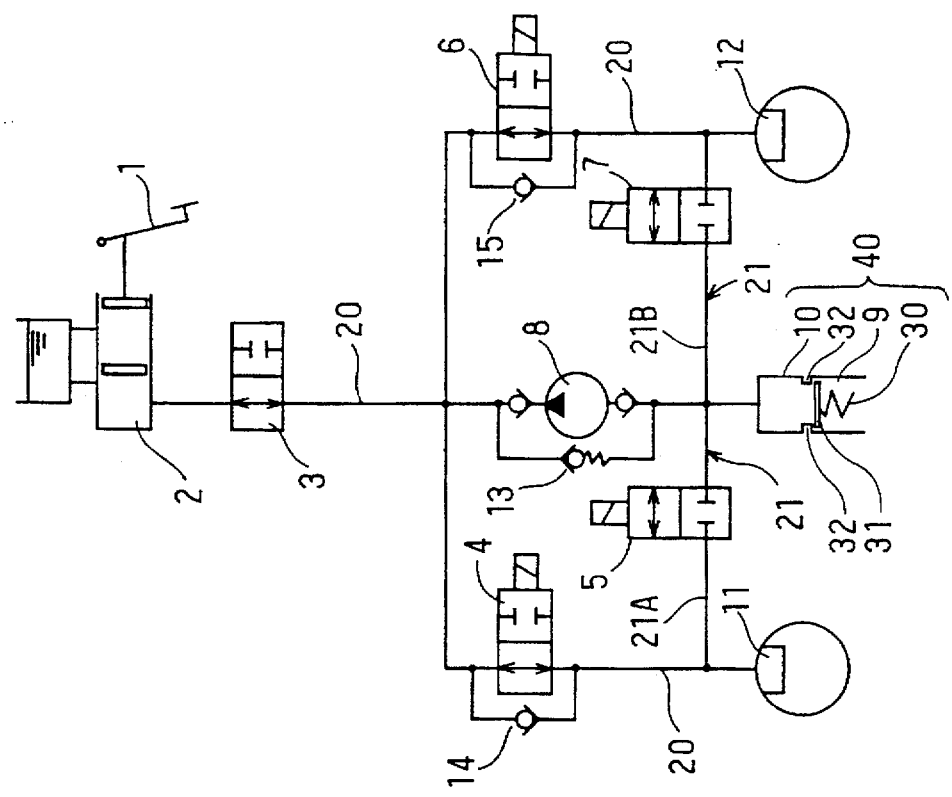
FIG. 2 is an oil pressure circuit showing the structure of a second embodiment.

For example, the brake fluid pressure apparatus can be formed as a second embodiment shown in FIG. 2. That is, in the previous embodiment, accumulation chamber 10 and reservoir 9 were separated. However, accumulation chamber 10A and reservoir 9A can be integrated into one body as an integrated reservoir 40. Integrated reservoir 40 has accumulation chamber 10A connected to the inlet of pump 8 and reservoir 9A behind it. In reservoir 9A, a spring 30 is provided, which pushes the brake fluid out of reservoir 9A. The pressure of the brake fluid in reservoir 9A is around two atmospheres. A pushing board 31 is connected to an one end of spring 30. A stopper 32 prevents pushing board 31 from approaching the inlet of pump 8 beyond stopper 32 to ensure a fixed capacity of accumulation chamber 10A.

When pushing board 31 comes into contact with stopper 32, sufficient airtightness of accumulation chamber 10A is required. Unless the airtightness of accumulation chamber 10A is ensured, negative pressure is not generated in accumulation chamber 10. The brake fluid returning to reservoir 9A during anti-skid control pushes down pushing board 31 against spring 30 and is reserved in reservoir 9A. When the brake fluid pressures in wheel cylinders 11 and 12 are increased, pump 8 pumps out the brake fluid from accumulation chamber 10A and reservoir 9A. After pushing board 31 comes into contact with stopper 32, i.e., the brake fluid in reservoir 9A is discharged, the brake fluid flows out of accumulation chamber 10A and the negative pressure is generated in accumulation chamber 10A due to the flow of the brake fluid. The brake fluid is returned to accumulation chamber 10A due to the negative pressure after anti-skid control terminates. During traction control, the brake fluid pressures in wheel cylinders 11 and 12 are increased by the brake fluid pumped out from accumulation chamber 10A. After traction control terminates, the brake fluid is returned to accumulation chamber 10A due to the negative pressure as well.

As described above, integrated reservoir 40 in which reservoir 9A and accumulation chamber 10A are integrated into one body makes the structure of the brake fluid pressure control apparatus simpler.

Figure 3:
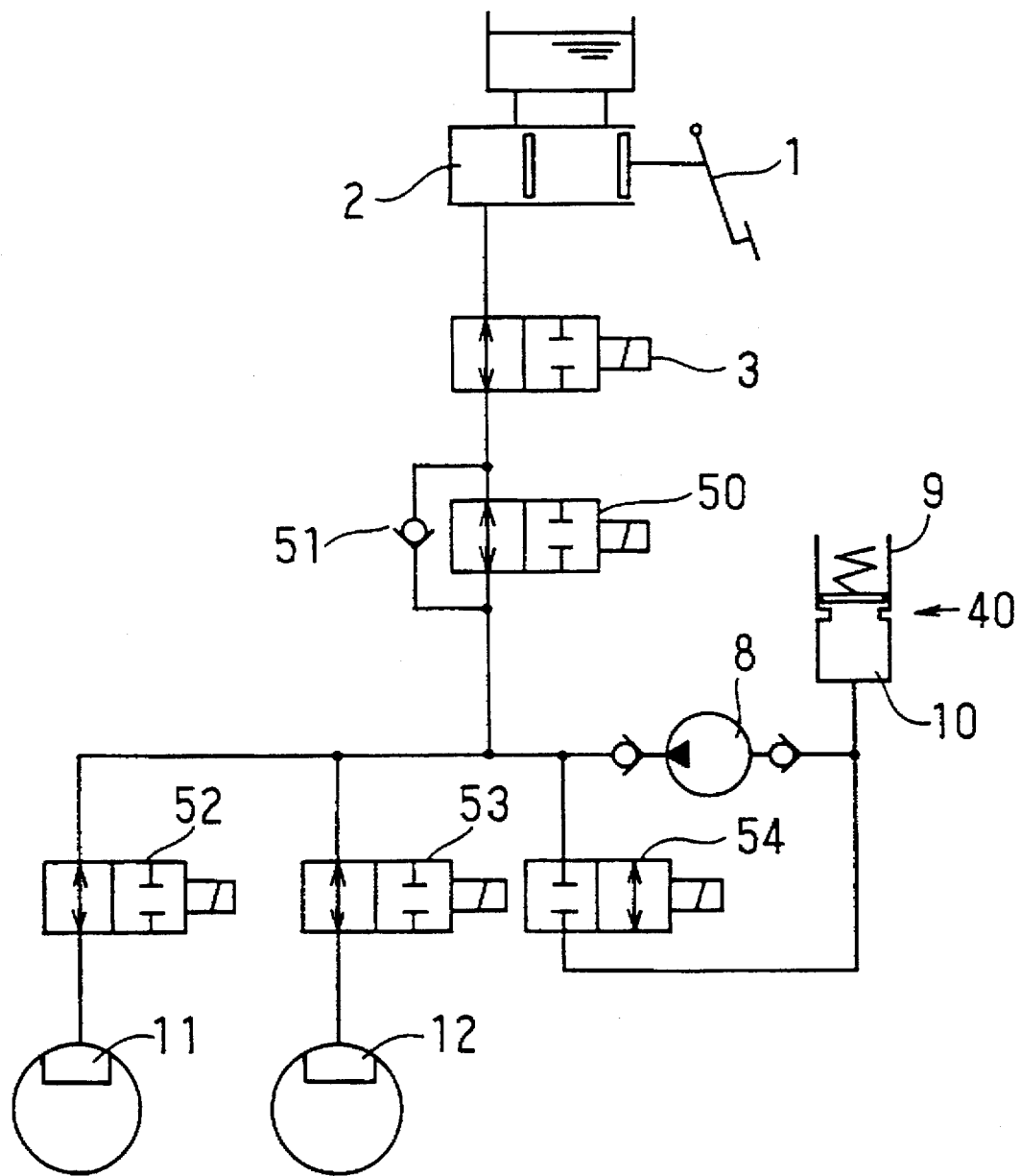
FIG. 3 is an oil pressure circuit showing the structure of a third embodiment.

Also, the brake fluid pressure apparatus can be formed as a third embodiment shown in FIG. 3. As shown in FIG. 3, a second master pressure cut-off valve 50 is provided. A check valve 51 is connected in parallel to second master pressure cut-off valve 50 so that check valve 51 allows only the flow of the brake fluid from wheel cylinders 11 and 12 to master cylinder 2. Second master pressure cut-off valve 50 is disposed between master pressure cut-off valve 3 and wheel cylinders 11 and 12. Further, control valves 52 and 53 are provided for wheel cylinders 11 and 12 to independently control the brake fluid pressures in wheel cylinders 11 and 12. In addition, a return conduit is provided so that the outlet of pump 8 and integrated reservoir 40 are connected. A return control valve 54 is disposed in the return conduit.

The operation of the brake fluid pressure control apparatus as described above will be explained below.

During the normal brake operation, each valve takes positions as shown in FIG. 3. Master pressure cut-off valve 3 is opened during anti-skid control and is closed during traction control. Second master pressure cut-off valve 50 is closed during anti-skid control and is opened during traction control. When the driver reduces the depression of brake pedal 1 during anti-skid control, the brake fluid applied to wheel cylinders 11 and 12 is returns to master cylinder 2 through check valve 51, provided that control valves 52 and 53 are opened. If master pressure cut-off valve 3 is not provided, the brake fluid pressures in wheel cylinders 11 and 12 cannot be increased because the brake fluid pumped out from pump 8 flows toward master cylinder 2. However, the flow of the brake fluid toward master cylinder 2 is prohibited when master pressure cut-off valve 3 is closed during traction control. As a result, the brake fluid pressures in wheel cylinders 11 and 12 can be increased by the brake fluid pumped out from pump 8. The brake fluid pressures in wheel cylinders 11 and 12 can be increased, decreased and maintained by alternatively closing and opening control valves 52 and 53. When the brake fluid pressures in wheel cylinders 11 and 12 are decreased or maintained, the brake fluid pumped out from pump 8 is returned to reservoir 9A by opening return control valve 54.

In the brake fluid pressure control apparatus, master pressure cut-off valve 3 and accumulation chamber 10 are increased substantially. However, the structure of the brake conduit is simplified more than that of the brake fluid pressure control apparatus shown in FIG. 1.

As described above, during at least traction control of the brake fluid pressure control, if the flow of the brake fluid from master cylinder 2 to wheel cylinders 11 and 12 is prohibited and accumulation chamber 10 is connected to the inlet of pump 8, anti-skid control and traction control can be performed.

Compressible gas or liquid may be enclosed in accumulation chamber 10 so that the gas or liquid does not leak from accumulation chamber 10 to brake conduit 21. As a result, when the brake fluid is pumped out from accumulation chamber 10, the gas or liquid expands instead of the brake fluid. The expansion of the gas or liquid promotes the generation of the negative pressure.

In the above embodiments, airtight accumulation chamber 10 having a fixed capacity was used to generate the negative pressure when the brake fluid is pumped out by pump 8. However, the means for generating the negative pressure is not limited to airtight accumulation chamber 10. For example, an elastic body such as a spring can be used. When the brake fluid is pumped out from accumulation chamber 10, the volume of accumulation chamber 10 gets small in proportion to the quantity of the brake fluid pumped out by pump 8. The spring storing a force of restitution against the change of volume of accumulation chamber 10 can be provided in accumulation chamber 10. In other words, the negative pressure is not caused by the compressible gas or liquid, but the elastic body provides an identical force to generate the negative pressure.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A brake fluid pressure control apparatus which controls a brake fluid pressure applied to a wheel cylinder to realize an optimum acceleration-slip condition of a wheel, said apparatus comprising:

an oil pressure source for applying the brake fluid pressure to said wheel cylinder;

pressure increasing and decreasing control means for alternatively increasing and decreasing the brake fluid pressure applied to said wheel cylinder in order to control an acceleration-slip of said wheel to assure an optimum condition;

a pump driven when said pressure increasing and decreasing control means controls the brake fluid pressure, sending out brake fluid toward said wheel cylinder to apply said brake fluid pressure to said wheel cylinder;

an accumulation chamber connected to an inlet of said pump for accumulating brake fluid beforehand in an airtight condition whereby when brake fluid accumulated beforehand is pumped out of said accumulation chamber by said pump a negative pressure is generated in said accumulation chamber;

prohibiting means for prohibiting a flow of the brake fluid between said oil pressure source and said wheel cylinder while said pump pumps out the brake fluid from said accumulation chamber, during control of wheel cylinder pressure by said pressure increasing and decreasing control means; and a return conduit for allowing said brake fluid discharged from said wheel cylinder to flow into said accumulation chamber when said brake fluid pressure is decreased by said pressure increasing and decreasing control means.

2. A brake fluid pressure control apparatus as claimed in claim 1, wherein said accumulation chamber has constant capacity in order to generate said negative pressure.

3. A brake fluid pressure control apparatus which performs an anti-skid control operation for controlling brake fluid pressure applied to a wheel cylinder to realize an optimum slip condition during a braking operation, and which performs a traction control operation for applying the brake fluid pressure to said wheel cylinder to reduce excessive slippage of a wheel during an accelerating operation, said apparatus comprising;

an oil pressure source for applying the brake fluid pressure to said wheel cylinder;

a pump driven when said anti-skid control and said traction control is performed, sending out brake fluid to apply said brake fluid pressure to said wheel cylinder;

an accumulation chamber connected to an inlet of said pump for accumulating brake fluid beforehand in an airtight condition, whereby when a quantity of brake fluid is pumped out of said accumulation chamber by said pump driven during performance of said traction control, a negative pressure is generated in said accumulation chamber;

prohibiting means for prohibiting a flow of the brake fluid between said oil pressure source and said wheel cylinder while at least said traction control operation controls a pressure of said wheel cylinder;

a return conduit for allowing said brake fluid discharged from said wheel cylinder to flow into said accumulation chamber when said brake fluid pressure is decreased after said brake fluid pressure is applied to said wheel cylinder by said traction control; and a reservoir connected to said inlet of said pump for storing the brake fluid discharged when said anti-ski control operations decreases the brake fluid pressure.

4. A brake fluid pressure control apparatus as claimed in claim 3, wherein said accumulation chamber has a fixed capacity to generate said negative pressure.

5. A brake fluid pressure control apparatus as claimed in claim 4, wherein a substance which expands when the brake fluid in said accumulation chamber flows out is enclosed in said accumulation chamber, said substance being selected from the group consisting of a gas and a liquid.

6. A brake fluid pressure control apparatus as claimed in claim 4, wherein said accumulation chamber and said reservoir are integrated into one body.

7. A brake fluid pressure control apparatus as claimed in claim 6, wherein a substance which expands when the brake fluid in said accumulation chamber flows out is enclosed in said accumulation chamber, said substance being selected from the group consisting of a gas and a liquid.

8. A brake fluid pressure control apparatus which controls a brake fluid pressure applied to wheel cylinders to realize an optimum acceleration-slip condition of wheels, said apparatus comprising:

- a master cylinder for generating said brake fluid pressure in response to depression of a brake pedal;
- first and second wheel cylinders provided to respective ones of said wheels for applying braking forces to said wheels when the brake fluid pressure acts thereon;
- a brake conduit connecting said master cylinder an said first and second wheel cylinders;
- a pump driven when the brake fluid pressures applied to said first and second wheel are adjusted to realize optimum slip conditions of said wheels, sending out the brake fluid toward said first and second wheel cylinders;
- an accumulation chamber connected to an inlet of said pump for accumulating brake fluid beforehand in an airtight condition, whereby when brake fluid accumulated beforehand is pumped out of said accumulation chamber by said pump a negative pressure is generated in said accumulation chamber;
- a master pressure cut-off valve for alternatively allowing and prohibiting the brake fluid to be transferred between said master cylinder and said first and second wheel cylinders, wherein said master pressure cut-off valve prohibits the brake fluid from said master cylinder from being transferred to said first and second wheel cylinders, prohibits the brake fluid from said master cylinder from being transferred to said inlet of said pump and prohibits the brake fluid from said pump from being transferred to said master cylinder, at least when the brake fluid pressures applied to said wheel cylinders are adjusted using the brake fluid which is pumped out from said accumulation chamber by said pump;
- a first pressure increasing control valve for alternatively allowing and prohibiting the brake fluid from said pump from flowing to said first wheel cylinder;
- a second pressure increasing control valve for alternatively allowing and prohibiting the brake fluid from said pump from flowing to said second wheel cylinder;
- a first return conduit connecting a reservoir connected to the inlet of said pump and said first wheel cylinder;
- a second return conduit connecting said reservoir and said second wheel cylinder;
- a first pressure decreasing control valve disposed in said first return conduit for alternatively allowing and prohibiting the brake fluid from said first wheel cylinder from flowing to said reservoir; and
- a second pressure decreasing control valve disposed in said second return conduit for alternatively allowing and prohibiting the brake fluid from said second wheel cylinder from flowing to said reservoir,
- wherein said accumulation chamber sucks and accumulates the same amount of the brake fluid accumulated therein beforehand by said negative pressure, after the brake fluid in said accumulation chamber decreases by being pumped up by said pump.

9. A brake fluid pressure control apparatus as claimed in claim 8, wherein said accumulation chamber has a fixed capacity to generate said negative pressure.

10. A brake fluid pressure control apparatus as claimed in claim 9, wherein a substance which expands when the brake fluid in said accumulation chamber flows out is enclosed in said accumulation chamber, said substance being selected from the group consisting of a gas and a liquid.

11. A brake fluid pressure control apparatus as claimed in claim 9, wherein said accumulation chamber and said reservoir are integrated into one body.

12. A brake fluid pressure control apparatus as claimed in claim 11, wherein a substance which expands when the brake fluid in said accumulation chamber flows out is enclosed in said accumulation chamber, said substance being selected from the group consisting of a gas and a liquid.

* * * * *